(12) United States Patent
Mittal et al.

(10) Patent No.: US 11,556,344 B2
(45) Date of Patent: Jan. 17, 2023

(54) HARDWARE COHERENT COMPUTATIONAL EXPANSION MEMORY

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 65 days.

(21) Appl. No.: 17/035,484

(22) Filed: Sep. 28, 2020

(65) Prior Publication Data

US 2022/0100523 A1 Mar. 31, 2022

(51) Int. Cl.
*G06F 9/38* (2018.01)
*G06F 9/30* (2018.01)
*G06F 9/54* (2006.01)
*G06F 12/0891* (2016.01)

(52) U.S. Cl.
CPC ........ *G06F 9/3816* (2013.01); *G06F 9/30123* (2013.01); *G06F 9/3877* (2013.01); *G06F 9/544* (2013.01); *G06F 12/0891* (2013.01)

(58) Field of Classification Search
CPC .. G06F 9/3816; G06F 9/30123; G06F 9/3877; G06F 9/544; G06F 12/0891; G06F 2212/621; G06F 12/0824
See application file for complete search history.

(56) References Cited

U.S. PATENT DOCUMENTS

| | | |
|---|---|---|
| 6,608,813 B1 | 8/2003 | Chiussi et al. |
| 6,914,907 B1 | 7/2005 | Bhardwaj et al. |
| 8,422,493 B2 | 4/2013 | Kono et al. |
| 8,787,374 B2 | 7/2014 | Maeda et al. |
| 9,306,845 B2 | 4/2016 | Kumagai et al. |
| 9,391,835 B2 | 7/2016 | Aoshima et al. |

(Continued)

FOREIGN PATENT DOCUMENTS

EP 2515294 A2 10/2012

OTHER PUBLICATIONS

Yunlong Xu et al: "Lock-based Synchronization for GPU Architectures", CF≤ 16 Proceedings of the ACM International Conference On Computing Frontiers, ACM, 2 Penn Plaza, Suite 701 New York NY 10121-0701 USA, May 16, 2016, pp. 205-213, XP058259517, DOI: 10.1145/2903150.2903155, ISBN: 978-1-4503-4128-8 p. 205-207.

(Continued)

*Primary Examiner* — Farley Abad
(74) *Attorney, Agent, or Firm* — Patterson + Sheridan, LLP (57) ABSTRACT

Embodiments herein describe transferring ownership of data (e.g., cachelines or blocks of data comprising multiple cachelines) from a host to hardware in an I/O device. In one embodiment, the host and I/O device (e.g., an accelerator) are part of a cache-coherent system where ownership of data can be transferred from a home agent (HA) in the host to a local HA in the I/O device—e.g., a computational slave agent (CSA). That way, a function on the I/O device (e.g., an accelerator function) can request data from the local HA without these requests having to be sent to the host HA. Further, the accelerator function can indicate whether the local HA tracks the data on a cacheline-basis or by a data block (e.g., multiple cachelines). This provides flexibility that can reduce overhead from tracking the data, depending on the function's desired use of the data.

20 Claims, 7 Drawing Sheets

(56) References Cited

U.S. PATENT DOCUMENTS

| | | |
|---|---|---|
| 9,525,591 B2 | 12/2016 | Yasuda et al. |
| 9,794,194 B2 | 10/2017 | Yasuda et al. |
| 10,097,466 B2 | 10/2018 | Tang et al. |
| 10,409,743 B1 | 9/2019 | Mittal et al. |
| 10,528,513 B1 | 1/2020 | Chan et al. |
| 10,698,824 B1 | 6/2020 | Mittal et al. |
| 2004/0034747 A1* | 2/2004 | Rowlands ........... G06F 12/0824 711/119 |
| 2007/0294485 A1 | 12/2007 | Zeffer et al. |
| 2009/0006668 A1 | 1/2009 | Vasudevan et al. |
| 2012/0131282 A1* | 5/2012 | Sun ................... G06F 12/0817 711/141 |
| 2014/0181394 A1* | 6/2014 | Hum ................... G06F 12/082 711/146 |
| 2014/0379997 A1* | 12/2014 | Blaner ............... G06F 12/0831 711/146 |
| 2017/0060606 A1 | 3/2017 | Hollinger |
| 2017/0353576 A1* | 12/2017 | Guim Bernat ...... H04L 67/2847 |
| 2018/0287964 A1 | 10/2018 | Gray |
| 2019/0004990 A1 | 1/2019 | Van Doren et al. |
| 2019/0042292 A1 | 2/2019 | Palermo et al. |
| 2019/0042425 A1 | 2/2019 | Shifer |
| 2019/0042518 A1 | 2/2019 | Marolia et al. |
| 2019/0065426 A1 | 2/2019 | Das Sharma et al. |
| 2019/0102311 A1 | 4/2019 | Gupta et al. |
| 2020/0042446 A1 | 2/2020 | Mittal et al. |
| 2020/0044895 A1 | 2/2020 | Mittal et al. |
| 2021/0200545 A1* | 7/2021 | Marolia .............. G06F 12/0835 |

OTHER PUBLICATIONS

U.S. Appl. No. 16/208,260, filed Dec. 3, 2018, Entitled: "Scratchpad Memory Management in a Computing System".

U.S. Appl. No. 16/053,488, filed Aug. 2, 2018, Entitled: "Hybrid Precise and Imprecise Cache Snoop Filtering".

U.S. Appl. No. 16/141,704, filed Sep. 25, 2018, Entitled: "Scalable Coherence Management Independent of Transport Protocol".

U.S. Appl. No. 16/053,384, filed Aug. 2, 2018, Entitled: "Logical Transport Over a Fixed PCIE Physical Transport Network".

U.S. Appl. No. 16/025,762, filed July 2. 2018, Entitled: "Logical Transport Overlayed Over a Physical Transport Having a Tree Topology".

U.S. Appl. No. 16/024,500, filed Jun. 29, 2018, Entitled: "Transparent Port Aggregation in Multichip Transport Protocols".

U.S. Appl. No. 15/967,473, filed Apr. 30, 2018, Entitled: "Circuit for and Method of Providing a Programmable Connector of an Integrated Circuit Device".

U.S. Appl. No. 16/425,841, filed May 29, 2019, Entitled: "Hybrid Hardware-Software Coherent Framework".

* cited by examiner

HARDWARE COHERENT COMPUTATIONAL EXPANSION MEMORY

TECHNICAL FIELD

Examples of the present disclosure generally relate to transferring ownership of data from a host to an I/O device (e.g., an accelerator) in a cache coherent system.

BACKGROUND

Server CPU-Accelerator systems, such as those enabled by the Compute Express Link (CXL), Cache Coherent Interconnect for Accelerators (CCIX), QuickPath Interconnect (QPI)/Ultra Path Interconnect (UPI), AMD Infinity Fabric, NVLink, and OpenCAPI are all inherently hardware cache-coherent systems—i.e. the hardware maintains a universal, coherent view of accessed, modified, and cached data regardless of whether the processor or accelerator is acting as the producer or consumer of the data and metadata (information about the data).

Current shared-memory Host-Accelerator execution frameworks rely on fine-grained hardware coherency for producer-consumer interactions in those systems. Over time, at least one of the CPUs on the Host or attached Accelerator acts as a Producer or Consumer of the data or metadata as part of an application or as part of performing a function. Movement of that data between the producer-consumer pair is tracked at a fine-grained, cache line level, by hardware coherency mechanisms at either the Host or Accelerator, regardless of whether the producer-consumer actions between the Host CPU and Accelerator are at the coarse-grained, block, level. This fine-grained tracking also takes place regardless of whether the Home Node and Memory is adjacent to the Host CPU Producer/Consumer or adjacent to the Accelerator Producer/Consumer.

Hardware coherency based producer-consumer interactions rely on fine-grained tracking of data and metadata movement between the producer and consumer. Producer and consumer actions on data and metadata typically take place at cacheline (e.g. 64 Byte) granularity, regardless of whether the size of the data is orders of magnitude larger than a cacheline, e.g. in the MB, GB, or even TB granularity. The disadvantage of the fine grained hardware coherency enforcement is that fine-grained tracking independent of the size of the producer and consumer actions on data and metadata leads to inefficient use of resources, in terms of both resources that track this data movement (such as Caches and Snoop Filters), at a fine granularity, as well as coherency messaging overhead related to tracking the movement of the data and metadata, and ensuring the system maintains a universal, coherent view of accessed, modified, and cached data. The hardware coherency wmputational and messaging overhead at the Home Node also affects the performance of maintaining coherency for one region of memory where fine-grained tracking is needed, because concurrent coherency actions are taking place on another region of memory where Producer and consumer actions are such that coarse grained tracking would have sufficed. Thus, in current cache coherent systems, (i) the host needlessly tracks at a fine-grain the Accelerator coherency actions to Accelerator Attached memory managed by the Host, (ii) there is needless data movement consuming bandwidth and queueing resources between the Host and Accelerator—e.g., Accelerator accesses to local Accelerator Attached memory must loop through the Host because the memory is managed by the Host, (iii) there is an inefficient usage of caching resources for Accelerator coherency actions to Accelerator Attached memory if the Accelerator has a cache and the Accelerator Attached memory also has a cache, and (iv) Accelerator coherency actions to Accelerator Attached memory that are managed by the Host impact the performance of other Host-CPU to Host Memory coherency actions.

SUMMARY

One embodiment describes a computing system that includes a host comprising a request agent (RA) and a home agent (HA) and an input/output (I/O) device communicatively coupled to the host, where the I/O device comprises a computational slave agent (CSA) communicatively coupled to an accelerator function in the I/O device and the HA and the CSA and the HA are part of a same coherent domain. Further, the CSA is configured to request ownership of a data set from the HA so the CSA serves as a local HA for the data set and the accelerator function indicates whether the CSA, when serving as the local HA, tracks the data set at a cacheline-level or a data block-level.

Another embodiment described herein is a method that includes communicatively coupling a host comprising a RA and a HA to an I/O device, wherein the I/O device comprises a CSA communicatively coupled to an accelerator function in the I/O device and the HA where the CSA and the HA are part of a same coherent domain and requesting, using the CSA, ownership of a data set from the HA so the CSA serves as a local HA for the data set. Moreover, the accelerator function indicates whether the CSA, when serving as the local HA, tracks the data set at a cacheline-level or a data block-level.

Another embodiment described herein is a I/O device that includes an accelerator function and a CSA communicatively coupled to the accelerator function and an HA in the host where the CSA and the HA are part of a same coherent domain. The CSA is configured to request ownership of a data set from the HA so the CSA serves as a local HA for the data set and the accelerator function indicates whether the CSA, when serving as the local HA, tracks the data set at a cacheline-level or a data block-level.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe transferring ownership of data (e.g., cachelines or a block of data comprising multiple cachelines) from a host to hardware in an I/O device. In one embodiment, the host and I/O device (e.g., an accelerator device) are part of a cache-coherent system such as one enabled by CXL, CCIX, QPI/UPI, AMO Infinity Fabric, NVLink, and OpenCAPI. To mitigate or overcome the disadvantages discussed above, the techniques below can transfer ownership of data from a home agent (HA) in the host to a local HA in the I/O device—e.g., a computational slave agent (CSA). That way, a function on the I/O device (e.g., an accelerator function) can request data from the local HA without these requests having to be sent to the host HA. Further, the accelerator function can indicate whether the local HA should track the data at a cacheline-level or a data block-level. This provides flexibility that can reduce overhead from tracking the data, depending on the accelerator function's desired use of the data. In addition, ownership of the data can be shared by the host HA and the local HA which are in the same cache coherent domain. For example, a request agent (RA) on the host may retain a read-only copy of the data for reference, while the local HA enables the accelerator function on the I/O device to access the data without sending a request to the host HA.

Figure 1:
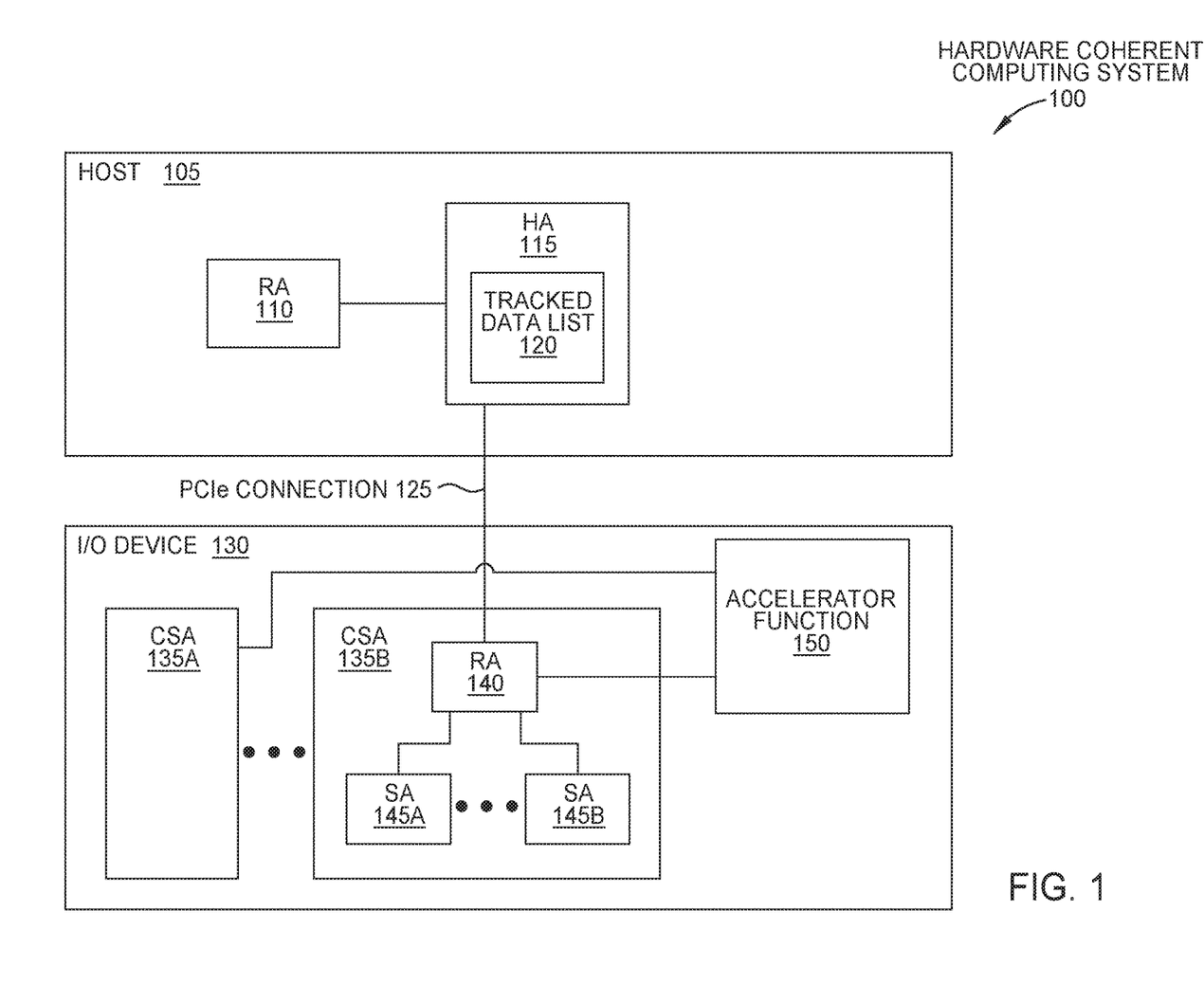
FIG. 1 is a block diagram of a host coupled to an accelerator device, according to an example.

FIG. 1 is a block diagram of a hardware cache coherent computing system 100 that includes a host 105 coupled to I/O device 130, according to an example. In the computing system 100, the host 105 (e.g., a server or other computing device or system) is communicatively coupled to the I/O device 130 (e.g., an accelerator device, field programmable gate array (FPGA), graphics processing unit (GPU), integrated circuit, printed circuit board (PCB), or system on a chip (SOC)) via a PCIe connection 125. In one embodiment, the I/O device 130 is integrated into the host 105 (e.g., a PCB card connected to a PCIe slot), or the device 130 may be external to the host 105.

The host 105 includes at least one RA 110 coupled to a HA 115 (referred to as the host HA). Although not shown, the host 105 can include any number of processors which can include any number of processing cores. The host 105 can also include memory with volatile memory elements, non-volatile memory elements, and combinations thereof. For example, a processor (or a software application executing on the processor) can be the RA 110 that performs read and write transactions to different addresses in the memory. The HA 115 is responsible for a memory address range in the system. In other words, the HA 115 has ownership of the memory addresses in the range so that cache coherency is maintained. When a RA 110 wants to modify data owned by the HA 115, the HA 115 must approve the request. Further, when the RA 110 wants to read data, the HA 115 ensures the RA 110 is provided with the most recent copy.

The I/O device 130 includes multiple CSAs 135 that are coupled to an accelerator function 150. That is, the accelerator function 150 can use the CSAs 135 in order to read and modify data that is tracked or owned by the host HA 115. For example, the accelerator function 150 (e.g., a machine learning function, cryptographic function, compression function, network function, etc. implemented on a hardware processing element or programmable logic) can send requests to read or write data to the CSA 135 which in turn forwards those requests to the HA 115. Often, the data being requested is stored in memory in the I/O device 130. Thus, it is advantageous for the data requested by the accelerator function 150 to be owned (or tracked) by a local HA in the I/O device 130 such as one of the CSAs 135 rather than the host HA 115.

As shown, the CSAs 135 include a RA 140 that is coupled to one or more slave agents (SA) 145. The CSA 135 can have at least three different states or modes of operation. In a first state, the CSA 135 does not track or own the data. For example, the I/O device 130 may be used by the host 105 as an expansion memory where data is stored in memory on the I/O device 130, but the I/O device 130 does not process the data (e.g., the accelerator function may not be operating on the data). This can be referred to as an invalid state since the CSA 135 does not serve as a local HA for the data. In another state, the CSA 135 functions as a local HA but in a shared state. In this state, the CSA 135 and the host HA 115 may share ownership of the data. That is, the CSA 135 and the host HA 115 may both track the data. An example of this state is where both the RA 110 in the host 105 and the RA 140 in the I/O device 130 have requested the data.

In a third state, the CSA 135 owns the data as a local HA while the host HA 115 does not (referred to as an exclusive state). In one embodiment, the host HA 115 does not have any record that the data is owned by the CSA 135. Put differently, the host HA 115 may not track that it has transferred ownership data to the CSA 135. This further reduces overhead in the HA 115. As shown, the HA 115 includes a tracked data list 120 indicated the memory addresses of the data it owns or tracks. When transferring ownership of data to the CSA 135, the memory addresses of the transferred data may be deleted from the tracked data list 120. Thus, if the host RA 110 requests the data, the HA 115 would not know where that data is, but would send a request (e.g., a snoop) to the CSAs 135 informing them that it wants ownership. The CSA 135 that is currently serving as the local HA for the data would then transfer ownership back to the host HA 115.

Figure 2:
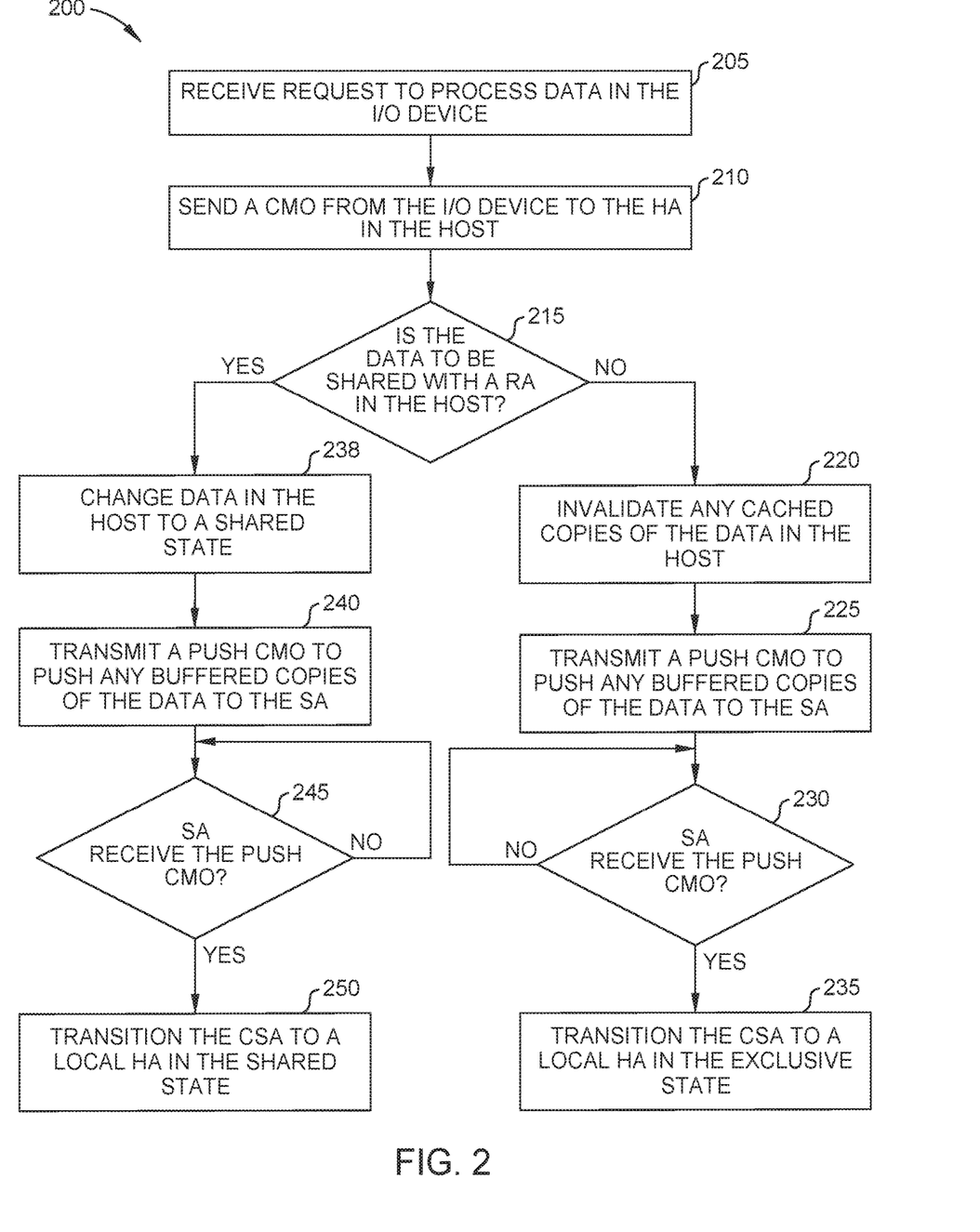
FIG. 2 is a flowchart transferring ownership of data to hardware in an I/O device, according to an example.

FIG. 2 is a flowchart of a method 200 transferring ownership of data to hardware in an I/O device (e.g., a CSA), according to an example. The method 200 begins with the assumption that the host HA owns or tracks the data (e.g., a data set that include one or more cachelines), which can include one or more cachelines. At block 205, the CSA, or more specifically, a RA in the GSA receives a request from an accelerator function in the I/O device to process data. The accelerator function also indicates whether the GSA should be become a local HA for the data (e.g., whether the CSA should transition from the invalidate state to either the shared state or the exclusive state).

Further, the accelerator function can indicate whether the CSA should track the data at a cacheline level or a block level. The accelerator function is the orchestrator that reads and/or modifies the data, and thus, knows whether the particular application will benefit more from the CSA tracking each cacheline individually or tracking multiple cachelines as a block of data, That is, one application may benefit more from the GSA tracking the data at a cacheline level while another benefits more from the GSA tracking the data at a block level In one embodiment, the accelerator function may execute code or have programmable logic that expresses a pattern of behavior that can benefit more from tracking at the cacheline level or from tracking at the block level.

At block 210, the CSA or RA in the I/O device sends a cache maintenance operation (CMO) to the host HA. In one embodiment, the CMO indicates that the host HA should transfer ownership of the data indicated in the CMO to the CSA. For example, the CMO may be a clean invalidate operation where the host. HA identifies and pushes the most recent version of the requested data (which may be stored in one or more local caches in the host such as a last level cache or buffer) to the GSA.

At block 215, the GSA determines whether the data is to be shared with the RA in the host. For example, the host RA may want to retain a copy of the data. In that scenario, the accelerator function may be the producer and is performing computations on the data. Regardless whether the accelerator function modifies the data or the host has a cached copy, switching the GSA to the shared state allows the host RA to continue to reference its local cache copies (e.g., read only data structures for fast access). Unlike when the GSA is in the exclusive state, when in the shared state, the host HA tracks the fact that the data is shared by RAs in the host and I/O device.

If the CSA is to own the data in the exclusive state, the method 200 proceeds to block 220 where the host HA invalidates any cached copies of the data in the host. In one embodiment, the host HA issues a flush CMO to remove the cached copies. Further, although not shown in the method 200, when flush and invalidating the cached copies of the data in the host, the host HA can also remove the data from its tracked data list since the local HA (i.e., the CSA) will own the data in the exclusive state. Thus, the host HA no longer has to track the data.

At block 225, the host HA transmits a push CMO to push any buffered copies of the data to the SAs in the CSA in the I/O device. However, pushing the data to the SA in the I/O device may not guarantee that the data actually reaches the SA. For example, the data may be stuck in a last-level cache or a buffer. Thus, the host HA may issue a new push CMO—CleanInvalidateDeep—which is complete only after the CMO reaches the SA. Thus, this push CMO is different from a flush which does not guarantee the data reaches the SA in the I/O device.

At block 230, the CSA waits until the SA receives the push CMO. That is, the CSA monitors the RA-to-SA traffic to determine when the push CMO reaches the SA. Once it does, at block 235, the CSA transitions to a local HA in the exclusive state where the CSA owns and tracks the data at either the cacheline level or the block level. As a result, the CSA can permit the local RA in the I/O device to read and modify the data without first getting permission from the host HA. Thus, when the accelerator function requests the data, the CSA can retrieve the data from memory and cache local copies of the data for the accelerator function to read and modify in the I/O device.

Returning to block 215, if ownership of the data should instead be shared by the host HA and the CSA (i.e., the local HA) rather than the CSA owning the data in the exclusive state, the method 200 proceeds to block 237 where the data in the host to be shared with the local HA is changed to a shared state. At block 240, the host HA transmits a push CMO to push any buffered copies of the data to the SA in the CSA. Notably, the host HA does not invalidate the cached copies of the data in the host, in contrast to block 220. Further, the host HA can use the same techniques as described in block 225 to push the data to the SA in the I/O device.

At block 245, the GSA waits until confirming the SA receives the push CMO. Once confirmed, at block 250, the CSA transitions to a local HA in the shared state. In this state, both the CSA and the host HSA track the data. For example, the host HA may track in its tracked data list that the data is used in both a RA in the host and an RA in the I/O device. Because the host HA must track that the data is being used by the RA in the host, also tracking that the same data is being used by an RA in the I/O device adds very little overhead (e.g., one or more additional bits) to the host HA.

Figure 3:
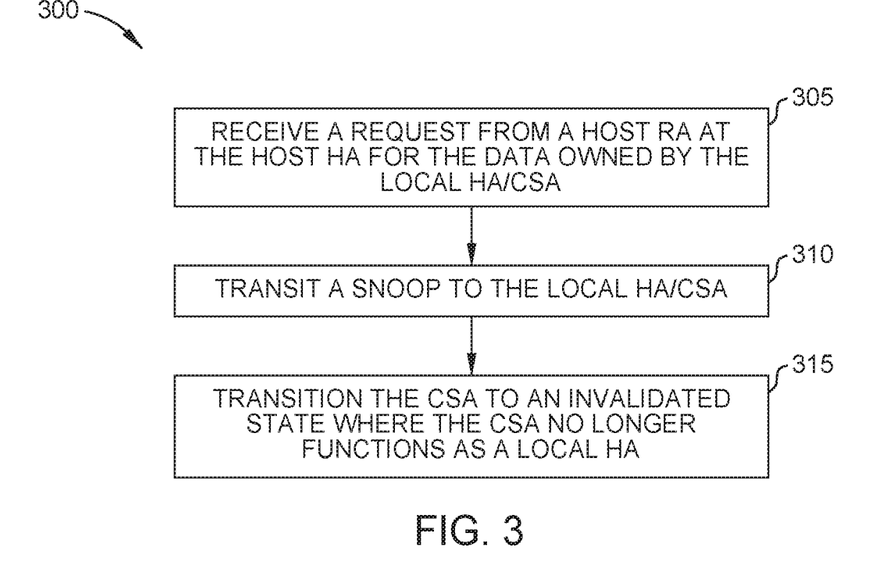
FIG. 3 is a flowchart for transferring ownership of data from hardware in the I/O device to the host, according to an example.

FIG. 3 is a flowchart of a method 300 for transferring ownership of data from hardware in the I/O device to the host, according to an example. The method 300 assumes that the CSA has transitioned to a local HA in either the shared or exclusive state as described in the method 200 in FIG. 2. When the GSA owns the data (either partially or exclusively), the host HA receives a request from an RA in the host to modify the data. Before permitting an RA on the host to edit the data, the host HA must again have exclusive ownership of the data.

At block 305, the host HA receives a request from an RA in the host for data that is currently owned by a local HA in either the shared or exclusive state. If the data is owned by the local HA in the shared state, the host HA may know that a RA in the I/O device is also using the data. If the data is owned by the local HA in the exclusive state, the host HA may not know which GSA is the local HA since, as discussed above, the host HA does not need to track the data once it is transferred to the local HA. In any case, the host HA can regain exclusive ownership of the data.

At block 310, the host HA transmits a snoop to the local HA/GSA. The snoop informs the local HA that the host HA wants back ownership of the data. In response, the local HA can flush the local caches so that the most up-to-date version of the data is transferred to the host.

At block 315, the CSA/local HA transitions to an invalidate state where the GSA no longer functions as a local HA. Thus, any requests from a RA in the I/O device for the data are forwarded to the host HA, rather than being serviced by the CSA. In this manner, the host HA can regain ownership of the data from the local HA.

Figure 4:
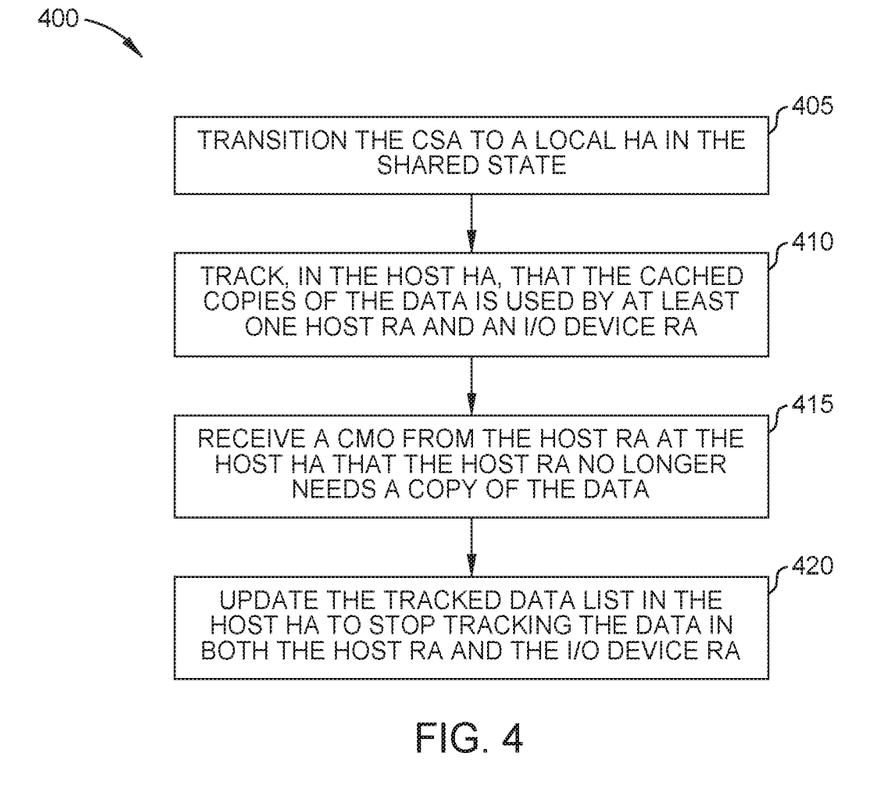
FIG. 4 is a flowchart for updating a host home agent when changing ownership from a shared state to an exclusive state, according to an example.

FIG. 4 is a flowchart of a method 400 for updating a host HA when changing ownership from a shared state to an exclusive state, according to an example. At block 405, the CSA transitions to a local HA in the shared state. That is, the CSA and the host HA share ownership of the same data. As a result, a RA in the host and a RA in the I/O device can both access the same data.

At block 410, the host HA tracks the fact that cached copies of the data are used by a host RA and an RA in the I/O device. That is, the tracked data list in the host HA may indicate both RAs in the host and the I/O device have cached copies of the data. Doing so permits, for example, the RA on the I/O device to modify the data while the host RA can retain a copy of the data for fast read-only data access. Because the host HA tracks both the host and I/O device usage of the data, if the host RA sends a request to modify the data, the host HA knows it first must invalidate and flush the copy of the data in the RA of the I/O device before permitting the host RA to modify the data.

However, at block 415, the host HA receives a CMO from the host RA that the host RA no longer needs to access a copy of the data. Thus, the only RA that needs the data, is the RA in the I/O device.

At block 420, the host HA updates the tracked data list to stop tracking the data in both the host RA and the I/O device RA, thereby reducing the overhead in the host HA. Further, the local HA can transition from the shared state to the exclusive state since the data is no longer being used by a RA in the host. If the RA in the host ever requests use of the data again, the system can then use the method 300 in FIG. 3 where the host HA can again share ownership with the local HA (and the local HA transitions to the shared state).

Figure 5:
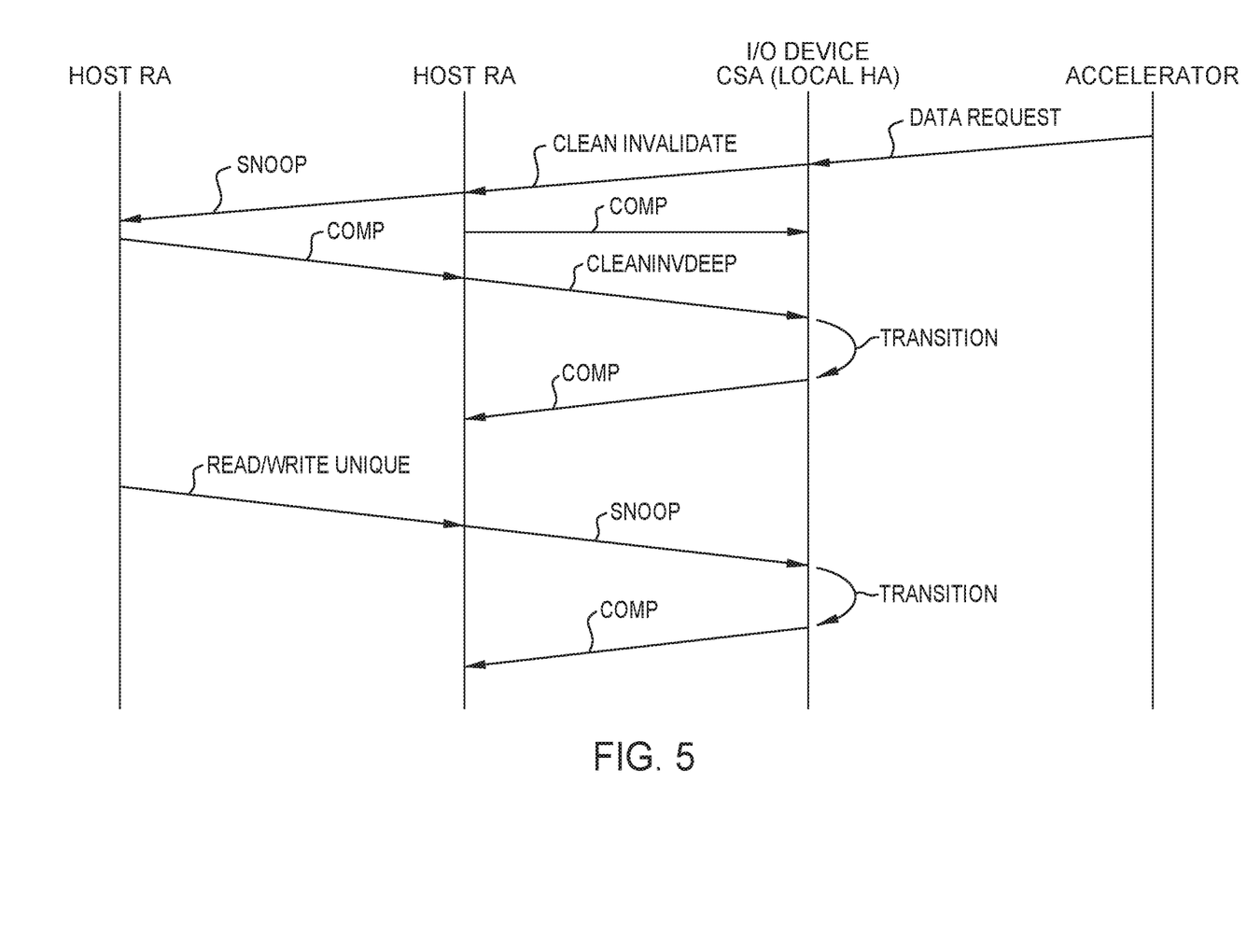
FIG. 5 is a timing chart for transferring ownership of a cacheline to hardware in the I/O device, according to an example.

FIG. 5 is a timing chart for transferring ownership of a cacheline to hardware in the I/O device, according to an example. In one embodiment, the timing chart in FIG. 5 provides additional details corresponding to the method 200 described in FIG. 2. The timing chart begins with the accelerator function transmitting a data request to the GSA in the I/O device for data owned by the host HA. That is, the CSA is currently not functioning as a local HA (i.e., the CSA is in an invalidate state).

In this embodiment, the data request from the accelerator is for a particular cacheline which indicates the CSA (after it transitions to a local HA in the exclusive state) should track the data at a cacheline level. In response, the CSA issues a Clean Invalidate CMO to the host HA which prompts the host HA to flush and invalidate cached copies of the cacheline in the host. As part of this process, FIG. 5 illustrates that the host HA issues a snoop to the host RA to invalidate and flush the cached copies. The host HA can also issue a completion (comp) CMO to the CSA indicating it received the Clean Invalidate CMO.

After receiving a comp from the snoop CMO, the host HA issues a push CMO (i.e., a Clean Invalidate Deep (CleanInvDeep)) to the CSA. As discussed above, when performing a flush, the flushed copies of the cacheline may get stuck in a last-level cache or buffer and not reach the SA in the CSA. The push CMO ensures the most up-to-date version of the cacheline reaches the SA.

Once confirming the CleanInvDeep reaches the SA, the CSA can transition to a local HA in the exclusive state and local access of the cacheline by the accelerator is permitted. The CSA can send a confirmation that it received the push CMO to the host HA. The host HA can stop tracking the cacheline in its tracking data list. Further, the timeline in FIG. 5 can also be used to transition the CSA to a local HSA in the shared state, but in that embodiment, the cached copies in the host may not be invalidated. That is, the CSA may send a different CMO than the Clean Invalidate so that the host HA does not invalidate the cached copies.

FIG. 5 also illustrates a host HA again receiving ownership of the cacheline, as described in the method 300 in FIG. 3. After transferring ownership to the CSA, later, as shown by the timeline, the host RA requests access to the cacheline using a Read Unique or Write Unique request. For example, a processor function executing in the host may want to read or modify the cacheline. Because the host HA is not tracking the cacheline, the host HA sends a snoop to the CSA which instructs the CSA to transmit the most up-to-date version of the cacheline to the host HA. Further, the CSA transitions from functioning as a local HA to the invalidate state where it no longer serves as a local HA.

Figure 6:
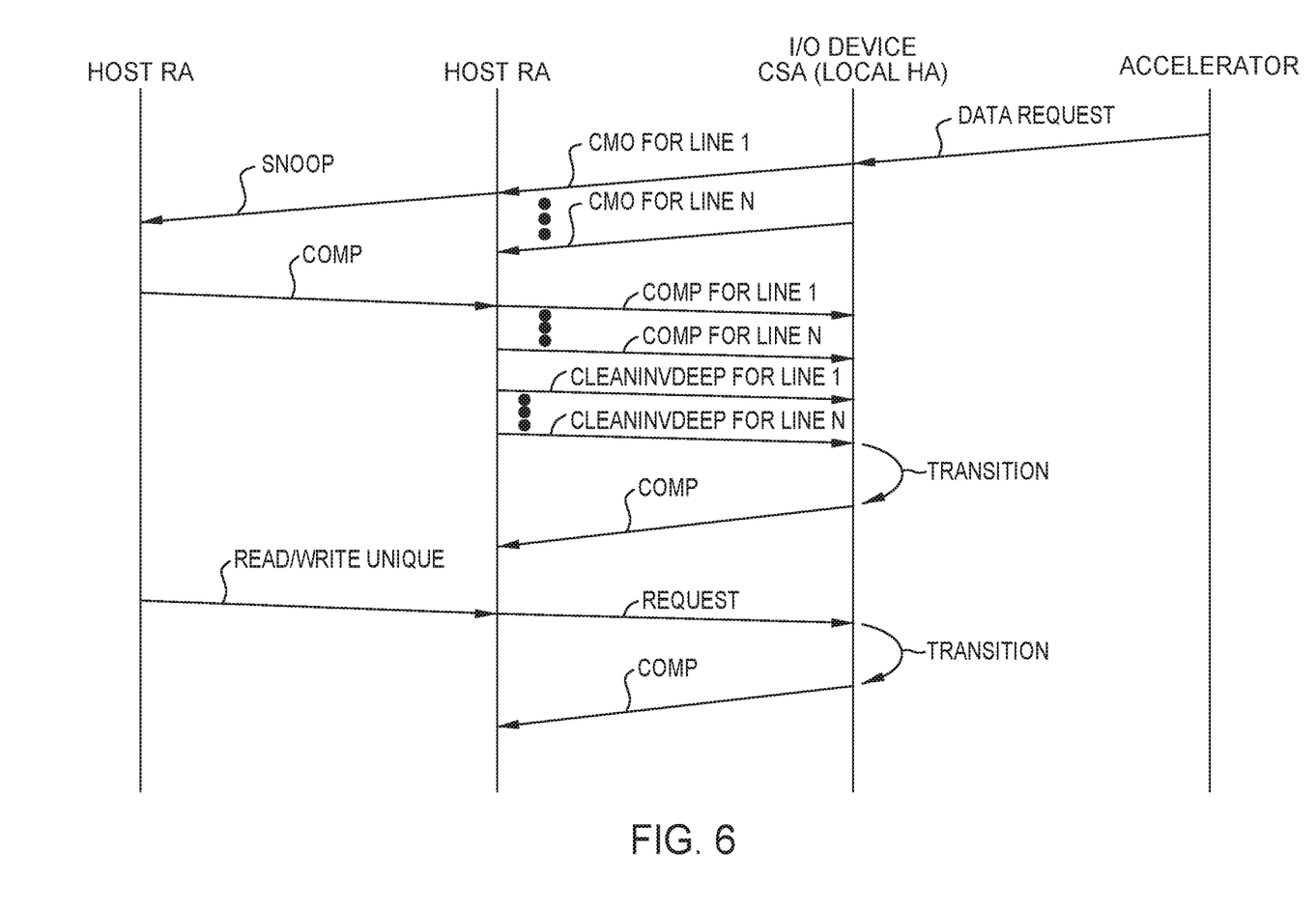
FIG. 6 is a timing chart for transferring ownership of multiple cachelines to hardware in the I/O device, according to an example.

FIG. 6 is a timing chart for transferring ownership of multiple cachelines to hardware in the I/O device, according to an example. That is, unlike in FIG. 5 where the accelerator function requests ownership of a single cacheline, the accelerator in FIG. 6 sends a data request for multiple cachelines, where the CSA should track the cachelines individually. In response, the CSA issues CMOs for each of the cachelines (i.e., lines 1-N). As discussed above, the type of CMO varies depending on whether the CSA will transition to the shared state or to the exclusive state. If the shared state, the host HA may not invalidate the cached copies in the host.

Like above, the host HA issues one or more snoops to the host RA to retrieve the most up-to-date version of the data and sends comp CMOs to the CSA corresponding to each cacheline. Once receiving a comp CMO in response to the snoop, the host HA can transmit push CMOs (i.e., CleanInvDeep CMOs) for the cachelines 1-N so that the cachelines are pushed to the SA in the CSA. Once the CSA receives the push CMO for the last cacheline (i.e., Line N), it can transition to performing as a local HA in either the shared or exclusive state.

Later, the host RA can request access to the cachelines using a read/write unique request. As discussed above, the host HA can then retrieve ownership of the CSA which transitions to the invalidate state (or to a shared state if ownership is shared by both the local and host HA).

Figure 7:
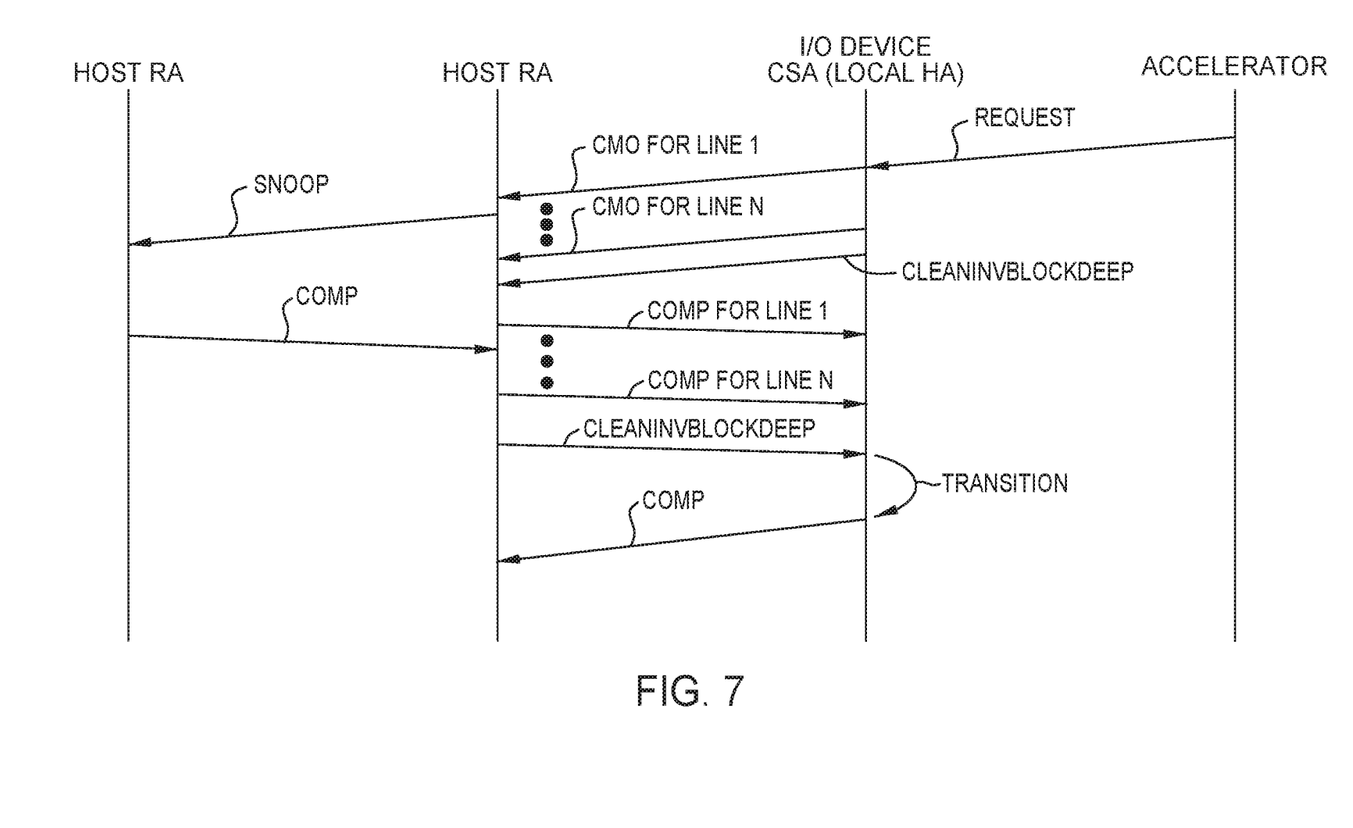
FIG. 7 is a timing chart for transferring ownership of a block of data to hardware in the I/O device, according to an example.

FIG. 7 is a timing chart for transferring ownership of a block of data to hardware in the I/O device, according to an example. In this embodiment, the accelerator sends a request for a block of data that include multiple cachelines. That is, instead of the CSA tracking individual cachelines, FIG. 7 indicates an accelerator instructing the CSA to transition to a local HA and track the corresponding data at a block level rather than a cacheline level.

In response, the CSA sends CMOs for each cacheline in the block (e.g., lines 1-N). Again, the type of CMO will vary if the accelerator has instructed the host HA and CSA to share ownership of the data block or if the data block is owned exclusively by the CSA. After sending the CMOs for each cacheline in the data block, the CSA, or more specifically, the RA in the GSA transmits a Clean Invalidate Block Deep (CleanInvBlockDeep) to the host HA. The GSA then begins to monitoring the block cache state.

The host HA issues a snoop CMO to the host RA, and issues comps to the CSA, as discussed above. However, unlike in FIG. 6 where the host HA issues a push CMO for each cacheline (after receiving the comp from the host RA), the host HA issues the push CMO CleanInvBlockDeep back to the CSA. In one embodiment, the CSA receives a CleanInvBlockDeep for each aggregated port (assuming aggregated ports are enabled). If not, the host HA issues a single CleanInvBlockDeep. After receiving the CleanInvBlockDeep, the CSA can transition to serving as a local HA, either in the shared or exclusive state.

Although not shown in FIG. 7, the host HA can regain partial or exclusive ownership of the block of data using the techniques discussed above.

The techniques above offer several non-limiting advantages. For example, the host HA no longer tracks at a fine-grain the Accelerator coherency actions to Accelerator Attached memory managed by the Host because the Accelerator has transparently migrated the coherency management from the Host to the Accelerator. Further, Host tracking resources such as Snoop Filters are also no longer being consumed unnecessarily and these resources are freed up to improve tracking resources for Host-CPU-Memory interactions using these same Snoop Filters. Moreover, following migration of coherency management from the Host to the Accelerator, the Accelerator directly accesses the local Accelerator Attached memory, thus eliminating the needless data movement between the Host and Accelerator. Also, there is an efficient usage of caching resources at the Accelerator—an Accelerator cache can act as both an Accelerator cache and Accelerator Attached memory cache based on the use-case and traffic patterns. Moreover, Accelerator coherency actions to Accelerator Attached memory no longer impact the Host and thus no longer impact the performance of other Host-CPU to Host Memory coherency actions.

Figure 8:
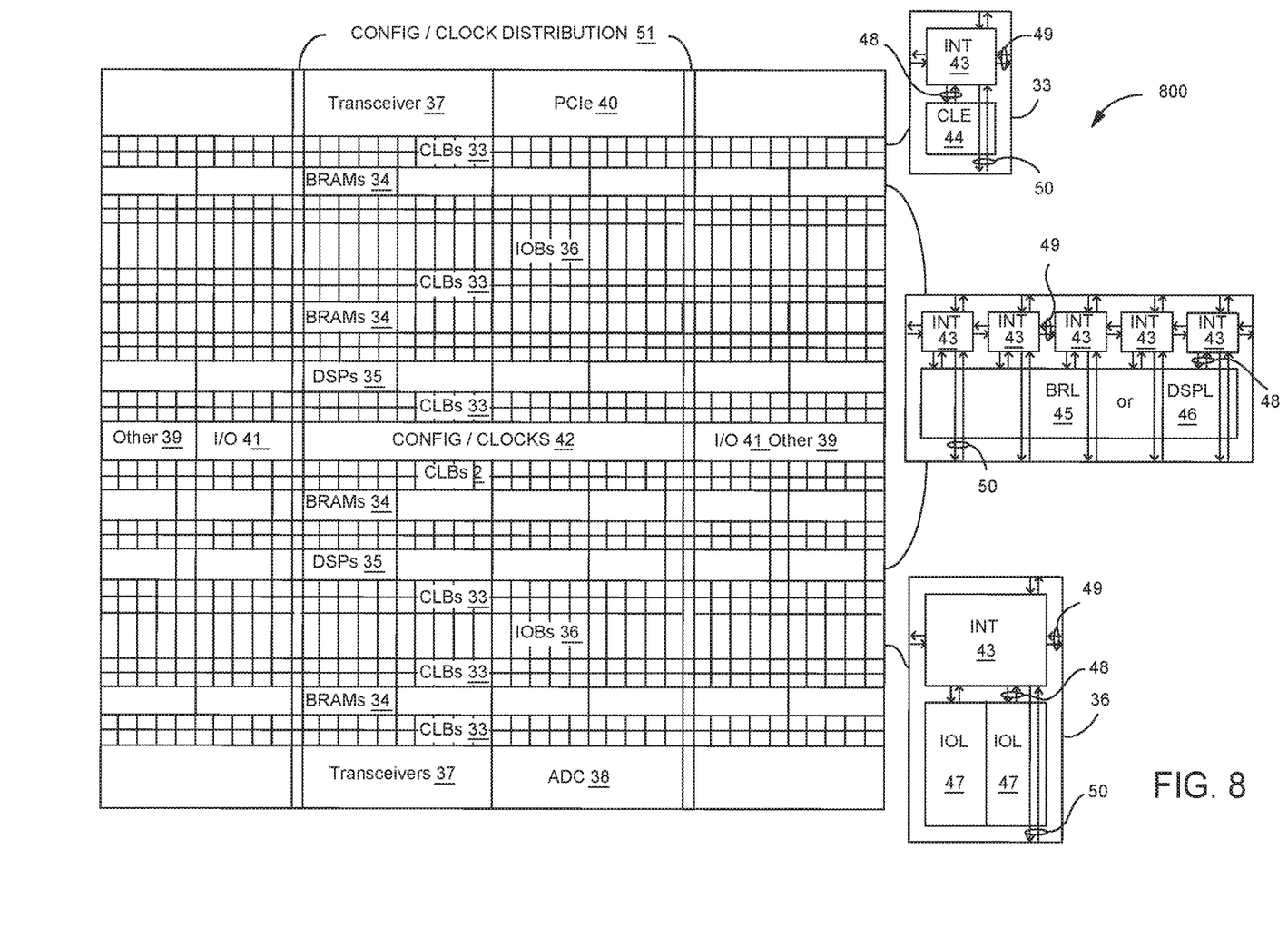
FIG. 8 illustrates a field programmable gate array implementation of a programmable IC according to an example.

FIG. 8 illustrates an FPGA 800 implementation of the I/O device 130, and more specifically with a FPGA with a PL array that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable the can include at least one programmable interconnect element ("INT") 43 having connections to input and output terminals 48 of a programmable logic element within the same tile, as shown by examples included at the top of FIG. 8. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLS 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual 10 pads connected, for example, to the IO logic element 47 typically are not confined to the area of the input/output logic element 47.

In the pictured example, a horizontal area near the center of the die (shown in FIG. 8) is used for configuration, clock, and other control logic. Vertical columns 51 extending from this horizontal area or column are used to distribute the docks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A hardware accelerator, comprising:
an accelerator function circuit; and
a computational slave agent (CSA) communicatively coupled to the accelerator function circuit and is configured to communicate with a home agent (HA) in a host communicatively coupled to the hardware accelerator, wherein the CSA and the HA are part of a same coherent domain,
wherein the CSA is configured to request ownership of a data set from the HA so the CSA serves as a local HA for the data set,
wherein the accelerator function circuit indicates whether the CSA, when serving as the local HA, tracks the data set at a cacheline-level or a data block-level.

2. The hardware accelerator of claim 1, wherein, before the CSA requests ownership of the data set from the HA, the accelerator function circuit is configured to send a request to at least one of read or modify the data set to the CSA, wherein the request from the accelerator function circuit indicates whether the CSA tracks the data set at the cacheline-level or the data block-level.

3. The hardware accelerator of claim 2, wherein, the HA is configured to perform a snoop to a request agent (RA) in the host to flush cached copies of the data set from the host in response to the request from the CSA.

4. The hardware accelerator of claim 3, wherein the HA is configured to transmit a push cache maintenance operation (CMO) to the CSA after receiving an indication that the snoop has completed, wherein the push CMO forces any cached copies of the data set that are stuck in a buffer or a last level cache to move to a slave agent in the CSA.

5. The hardware accelerator of claim 4, wherein after determining the slave agent has received the push CMO, the CSA transitions to serving as the local HA for the data set.

6. The hardware accelerator of claim 1, wherein the CSA can serve as the local HA in one of (i) an exclusive state where the HA in the host does not track the data set or (ii)

a shared state where both the CSA and the HA track the data set, and a RA in the host has a cached copy of the data set.

7. The hardware accelerator of claim 1, wherein the HA is configured to:
- delete memory addresses of the data set from a tracked data list in response to transferring ownership of the data set to the CSA;
- receive a request from a RA in the host to modify the data set after the CSA has begun to serve as the local HA; and
- transmit a request to the CSA to transition to an invalidate state where the CSA no longer serves as the local HA, wherein ownership of the data set is returned to the HA.

8. A method, comprising:
- communicatively coupling a host comprising a RA and a HA to an I/O device, wherein the I/O device comprises a CSA communicatively coupled to an accelerator function circuit in the I/O device and the HA, wherein the CSA and the HA are part of a same coherent domain; and
- requesting, using the CSA, ownership of a data set from the HA so the CSA serves as a local HA for the data set, wherein the accelerator function circuit indicates whether the CSA, when serving as the local HA, tracks the data set at a cacheline-level or a data block-level.

9. The method of claim 8, further comprising, before the CSA requests ownership of the data set from the HA:
- sending a request from the accelerator function circuit to at least one of read or modify the data set to the CSA, wherein the request from the accelerator function circuit indicates whether the CSA tracks the data set at the cacheline-level or the data block-level.

10. The method of claim 9, further comprising:
- performing, using the HA, a snoop to the RA to flush cached copies of the data set from the host in response to the request from the CSA.

11. The method of claim 10, further comprising:
- transmitting, from the HA, a push CMO to the CSA after receiving an indication that the snoop has completed, wherein the push CMO forces any cached copies of the data set that are stuck in a buffer or a last level cache to move to a slave agent in the CSA.

12. The method of claim 11, further comprising, after determining the slave agent has received the push CMO:
- transitioning the CSA to serve as the local HA for the data set.

13. The method of claim 8, wherein the CSA can serve as the local HA in one of (i) an exclusive state where the HA in the host does not track the data set or (ii) a shared state where both the CSA and the HA track the data set, and the RA in the host has a cached copy of the data set.

14. The method of claim 8, further comprising:
- receive at the HA a request from the RA to modify the data set after the CSA has begun to serve as the local HA; and
- transmit from the HA a request to the CSA to transition to an invalidate state where the CSA no longer serves as the local HA, wherein ownership of the data set is returned to the HA.

15. An accelerator device configured to be communicatively coupled to a host, the accelerator device comprising:
- an accelerator function circuit; and
- a CSA communicatively coupled to the accelerator function circuit and an HA in the host, wherein the CSA and the HA are part of a same coherent domain,
- wherein the CSA is configured to request ownership of a data set from the HA so the CSA serves as a local HA for the data set,
- wherein the accelerator function circuit indicates whether the CSA, when serving as the local HA, tracks the data set at a cacheline-level or a data block-level.

16. The accelerator device of claim 15, wherein, before the CSA requests ownership of the data set from the HA, the accelerator function circuit is configured to send a request to at least one of read or modify the data set to the CSA, wherein the request from the accelerator function circuit indicates whether the CSA tracks the data set at the cacheline-level or the data block-level.

17. The accelerator device of claim 16, wherein, the HA is configured to perform a snoop to a RA in the host to flush cached copies of the data set from the host in response to the request from the CSA.

18. The accelerator device of claim 17, wherein the HA is configured to transmit a push CMO to the CSA after receiving an indication that the snoop has completed, wherein the push CMO forces any cached copies of the data set that are stuck in a buffer or a last level cache to move to a slave agent in the CSA.

19. The accelerator device of claim 18, wherein after determining the slave agent has received the push CMO, the CSA transitions to serving as the local HA for the data set.

20. The accelerator device of claim 15, wherein the CSA can serve as the local HA in one of (i) an exclusive state where the HA in the host does not track the data set or (ii) a shared state where both the CSA and the HA track the data set, and a RA in the host has a cached copy of the data set.

* * * * *

UNITED STATES PATENT AND TRADEMARK OFFICE
CERTIFICATE OF CORRECTION

PATENT NO. : 11,556,344 B2
APPLICATION NO. : 17/035484
DATED : January 17, 2023
INVENTOR(S) : Millind Mittal and Jaideep Dastidar It is certified that error appears in the above-identified patent and that said Letters Patent is hereby corrected as shown below:

In the Specification

Column 1, Line 53, Delete "wmputational" and insert -- computational --, therefor.

Column 4, Line 65, Delete "GSA" and insert -- CSA --, therefor.

Column 5, Line 1, Delete "GSA" and insert -- CSA --, therefor.

Column 5, Line 11, Delete "GSA" and insert -- CSA --, therefor.

Column 5, Line 12, Delete "GSA" and insert -- CSA --, therefor.

Column 5, Line 26, Delete "GSA" and insert -- CSA --, therefor.

Column 5, Line 27, Delete "GSA" and insert -- CSA --, therefor.

Column 5, Line 33, Delete "GSA" and insert -- CSA --, therefor.

Column 5, Line 35, Delete "GSA" and insert -- CSA --, therefor.

Column 6, Line 7, Delete "237" and insert -- 238 --, therefor.

Column 6, Line 16, Delete "GSA" and insert -- CSA --, therefor.

Column 6, Line 31, Delete "GSA" and insert -- CSA --, therefor.

Column 6, Line 42, Delete "GSA" and insert -- CSA --, therefor.

Column 6, Line 47, Delete "HA/GSA." and insert -- HA/CSA. --, therefor.

Signed and Sealed this
Thirteenth Day of June, 2023

Katherine Kelly Vidal
*Director of the United States Patent and Trademark Office*

CERTIFICATE OF CORRECTION (continued)
U.S. Pat. No. 11,556,344 B2

Column 6, Line 52, Delete "GSA" and insert -- CSA --, therefor.

Column 7, Line 27, Delete "GSA" and insert -- CSA --, therefor.

Column 8, Line 45, Delete "GSA" and insert -- CSA --, therefor.

Column 8, Line 46, Delete "GSA" and insert -- CSA --, therefor.

Column 9, Line 30 (approx.), Delete "the" and insert -- tile --, therefor.

Column 9, Line 52, Delete "CLS" and insert -- CLB --, therefor.

Column 9, Line 66, Delete "10" and insert -- IO --, therefor.